(12) United States Patent
Noirie et al.

(10) Patent No.: US 7,254,328 B2
(45) Date of Patent: Aug. 7, 2007

(54) RECONFIGURABLE DIRECTIONAL OPTICAL SYSTEM

(75) Inventors: Ludovic Noirie, Nozay (FR); Jean-Paul Faure, Paris (FR); Arnaud Bisson, Orsay (FR)

(73) Assignee: Alcatel, Paris (FR)

( * ) Notice: Subject to any disclaimer, the term of this patent is extended or adjusted under 35 U.S.C. 154(b) by 721 days.

(21) Appl. No.: 10/252,788

(22) Filed: Sep. 25, 2002

(65) Prior Publication Data

US 2003/0063840 A1     Apr. 3, 2003

(51) Int. Cl.
*H04J 14/00* (2006.01)

(52) U.S. Cl. .............................. 398/45; 398/48; 398/49

(58) Field of Classification Search .................. 398/45, 398/48–50, 55–57, 82, 83
See application file for complete search history.

(56) References Cited

U.S. PATENT DOCUMENTS

| | | | | |
|---|---|---|---|---|
| 5,018,129 A | * | 5/1991 | Netravali et al. ............. | 398/55 |
| 5,181,134 A | * | 1/1993 | Fatehi et al. .................. | 398/56 |
| 5,930,016 A | | 7/1999 | Brorson et al. | |
| 6,005,698 A | * | 12/1999 | Huber et al. .................. | 398/50 |
| 6,101,016 A | | 8/2000 | Roberts et al. | |
| 6,205,158 B1 | * | 3/2001 | Martin et al. ................ | 370/541 |
| 6,574,386 B1 | * | 6/2003 | Sufleta ......................... | 385/16 |
| 6,937,822 B2 | * | 8/2005 | Noirie et al. ................. | 398/45 |
| 2002/0131678 A1 | * | 9/2002 | Ravasui et al. ............... | 385/17 |

FOREIGN PATENT DOCUMENTS

EP        0790724 A2     8/1997

* cited by examiner

*Primary Examiner*—Dalzid Singh
(74) *Attorney, Agent, or Firm*—Sughrue Mion, PLLC

(57) ABSTRACT

A reconfigurable directional optical system comprises N ports that can be configured individually as inputs or outputs. A system of this kind comprises at least one optical device having unidirectional inputs and outputs the total number of which is equal to or less than N, and an N×N optical switch such that each of the ports can be coupled interchangeably either to one of the inputs or to one of the outputs of the optical device.

12 Claims, 4 Drawing Sheets

PRIOR ART

US 7,254,328 B2

RECONFIGURABLE DIRECTIONAL OPTICAL SYSTEM

CROSS-REFERENCE TO RELATED APPLICATIONS

This application is based on French Patent Application No. 01 12 596 filed Oct. 1, 2001, the disclosure of which is hereby incorporated by reference thereto in its entirety, and the priority of which is hereby claimed under 35 U.S.C. §119.

BACKGROUND OF THE INVENTION

1. Field of the Invention

The present invention relates generally to the technology of transmission on optical fibers and more particularly to a reconfigurable directional optical system.

2. Description of the Prior Art

Using optical fibers for new communication networks has become the norm. Large quantities of optical fibers have already been installed, often, as shown in FIG. 1A, in the form of cables 110 combining a plurality of fibers 120. The cables interconnect optical communication equipment units, for example an optical cross-connect (OXC) system 100 for distributing traffic between the fibers of three cables 110, 112, 114 in the particular example shown in FIG. 1A.

A communication network based on optical fibers can include other optical devices. FIG. 1B shows a device that is often needed, namely an optical add/drop multiplexer (OADM) 130 for optically adding and dropping local traffic. In this case, the OADM drops the portion of the traffic incoming on one or more fibers 132 and intended for local use and adds traffic 136 generated locally. Thus the traffic outgoing on one or more fibers 138 comprises all the incoming traffic 132 less the traffic 134 dropped locally plus the traffic 136 generated locally.

Another type of device used in optical networks, shown in FIG. 1C, is a light amplifier 140, often of the erbium-doped fiber amplifier (EDFA) type, which amplifies the level of the incoming light signals 142. If the latter must be propagated over great distances, the amplifier produces a level at the output 144 sufficient to process them locally or to relay them to a more distant destination.

The reader cannot have failed to notice, on examining FIGS. 1A, 1B and 1C, that the various optical devices shown always use the installed fibers in the same propagation direction. Thus, in FIG. 1A, the four fibers of the cable 114 on the left-hand side of the figure propagate light signals toward the right in the case of two of the fibers and toward the left in the case of the other two fibers. The situation is similar for the other two cables 110, 112. Thus the resources in terms of fibers are allocated in a fixed manner, which has the consequence that the resources in one direction must be allocated for the peak traffic in that direction. Persons skilled in the art of communication networks are well aware that the traffic at a node of a network can be highly asymmetric, one direction having to carry a much greater quantity of information than the other. This is the case with video distribution networks in particular, which are beginning to be installed and in which the quantity of information to be distributed, in the form of pictures, is always infinitely greater than the quantity of information contained in initial requests received from users. Also, the asymmetry of the traffic can change with time, for example over a period of 24 hours. This is the case with international data communications, for example between Europe and North America, because of time differences.

Thus the fixed allocation of resources in terms of optical fibers of a network presupposes that they be dimensioned for the peak traffic in both directions even though the traffic peaks may never occur simultaneously, with the result that some of the resources are always unused.

This is why the object of the invention is to provide a directional optical system that is reconfigurable so that network resources in terms of optical fibers can be allocated dynamically.

SUMMARY OF THE INVENTION

The invention therefore provides a reconfigurable directional optical system having N ports divided between a plurality of cables, each port being individually configurable as an input or an output and the system including:

at least one optical device having unidirectional inputs and outputs whose total number is less than or equal to N, and an N×N optical switch such that each of the ports can be coupled interchangeably either to one of the inputs or to one of the outputs of the optical device, the N×N optical switch including first and second connection layers based on smaller n×p optical switches, where n and p are less than N, in which system the number of small switches of the first switching layer is equal to the number of cables and the number of small switches of the second switching layer is equal to whichever is the greater of the number of inputs and the number of outputs of the optical device, so that an input and an output of the optical device can be connected to two separate cables from the plurality of cables.

The system according to the invention can change the propagation direction of light signals in a network of optical fibers to avoid having to dimension the network according to the peak traffic between two nodes of the network in both directions.

The objects, aims, features and advantages of the invention will emerge more clearly from the detailed description of a preferred embodiment of the invention, illustrated by the accompanying drawings.

DETAILED DESCRIPTION OF THE PREFERRED EMBODIMENTS

Figure 1A:
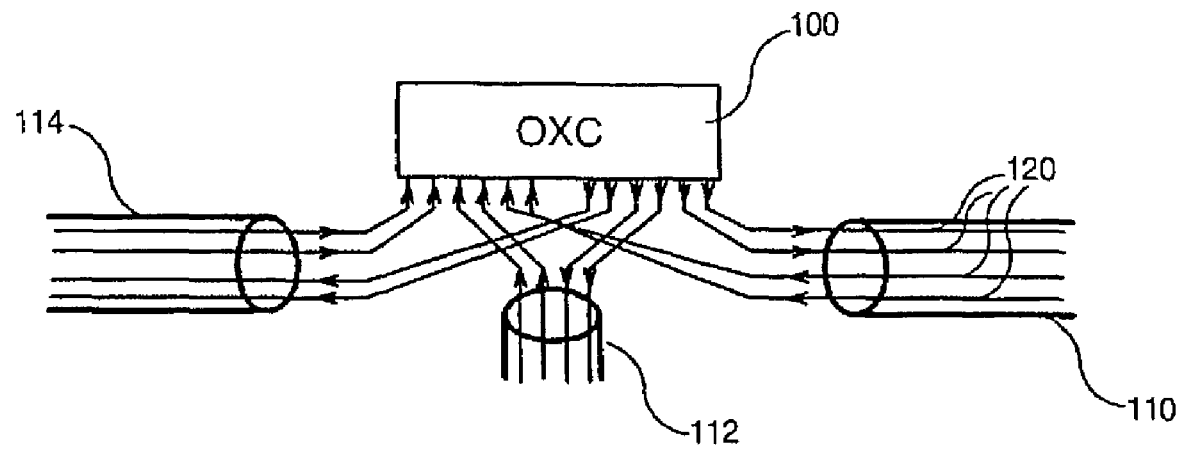
FIGS. 1A, 1B and 1C are examples of the prior art in which optical signals are always propagated in the same direction.
Figure 1B:
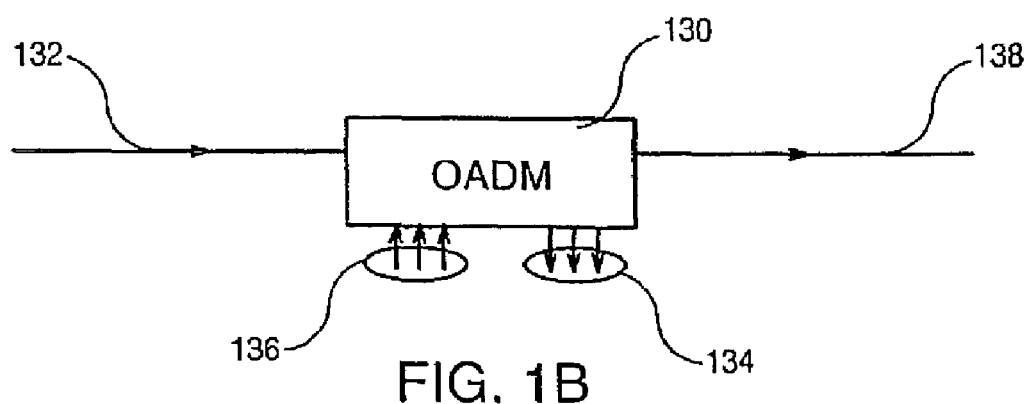
Figure 1C:
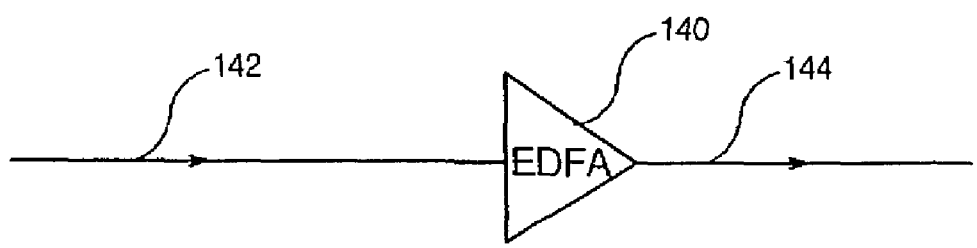
Figure 2:
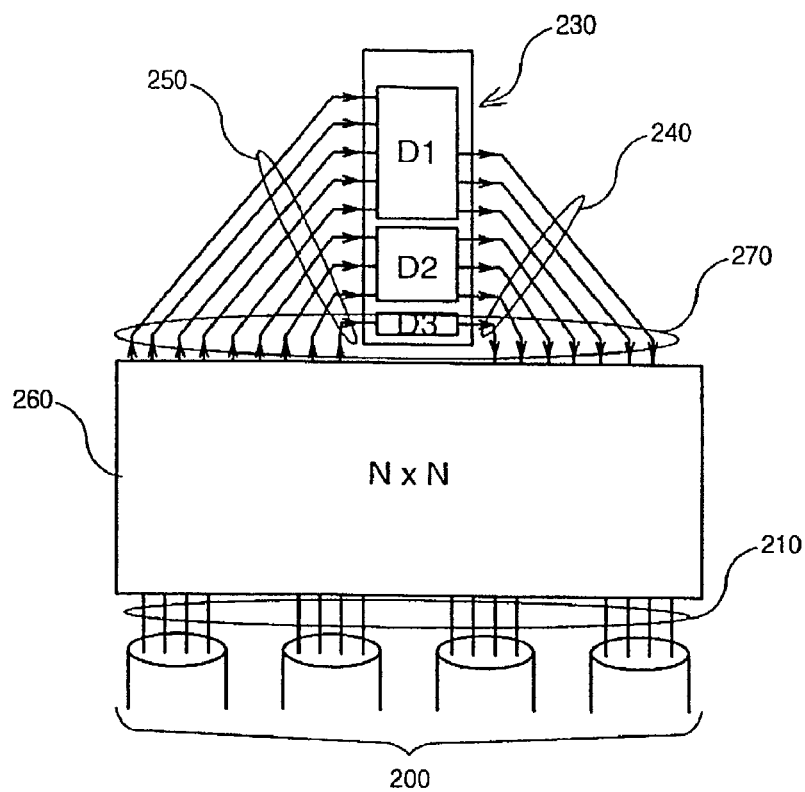
FIG. 2 shows a general embodiment of a system according to the invention.

The general principle of the invention is described with reference to FIG. 2, which shows a set of optical fiber cables 200 in which the propagation direction of each individual fiber, for example the fiber 210, is not allocated in a fixed manner, in contradistinction to the prior art previously discussed with reference to FIGS. 1A to 1C. The optical fibers must access a device 230 consisting of a plurality of subdevices D1, D2, D3 for processing optical signals that they transport. These devices include devices of the type shown in FIGS. 1A to 1C, i.e. OXC, OADM and optical amplifiers. Of course, the above list is not limiting on the invention and refers only to standard optical devices to which the invention may be relevant. According to the invention, access to these devices is obtained via an N×N optical switch 260 which is capable of optically connecting any of N upper inputs/outputs 270 and any N lower inputs/outputs 210. In this instance, N corresponds to the total number of inputs and outputs of the optical device 230, of which there are 16 in this particular example, divided into seven outputs 240 and nine inputs 250 connected to the upper inputs/outputs 270 of the optical switch 260. Various kinds of optical device 230 are available for processing information circulating on all the cables 200 and thus on at least N fibers, 16 fibers in this example being connected to the lower inputs/outputs 210 of the optical switch. Accordingly, the optical fibers can be distributed individually to make best use of the optical devices as a function of the traffic to be transported at a given time. This implies that the direction of circulation of the light signals 115 in the optical switch 260 is interchangeable between the top inputs/outputs 270 and the bottom inputs/outputs 210. FIG. 2 is merely one particular example of the use of the optical switch 260, of course.

Figure 3:
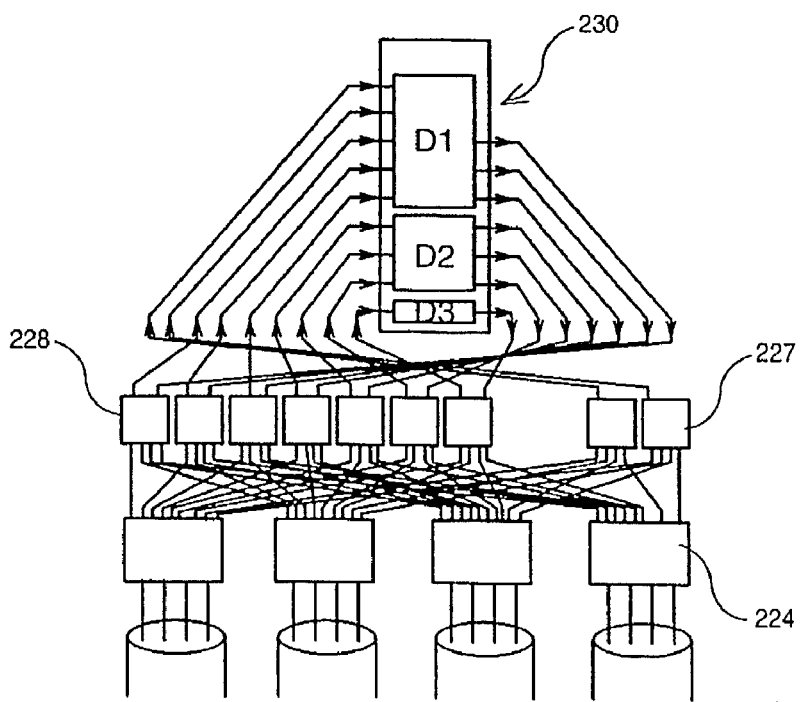
FIG. 3 shows a particular embodiment of an optical system according to the invention.

Based on the FIG. 2 general solution, FIG. 3 shows a more specific embodiment of the invention using smaller optical switches which therefore do not individually have the necessary 2×N inputs/outputs. The switch 260 in FIG. 2 can therefore be implemented in practice using two groups of smaller switches, for example. A first group comprises four 4×9 switches 224 constituting a first switching layer feeding a second layer comprising 4×2 switches 228 and 4×1 switches 227 (the 4×1 switches can in practice be 4×2 switches of which only one output is used). This provides the same functionality as FIG. 2, but with small switches. It will be noted in particular that the first layer of switches associates a switch with each cable, thus authorizing the switching of any fiber of a cable to any switch of the second layer. The latter associates a switch with each input/output pair of the directional device 230. If there are more inputs than outputs, as is the case in the FIG. 3 example, in which there are nine inputs and seven outputs, the second layer must further associate a switch 227 with each supplementary input, of which there are two in this example. The converse is equally true. If the directional device 230 has more outputs than inputs, a switch must be associated with each supplementary output. Accordingly, each of these switches of the second layer can connect an input and an output separately to two separate cables via the switches of the first layer.

Figure 4A:
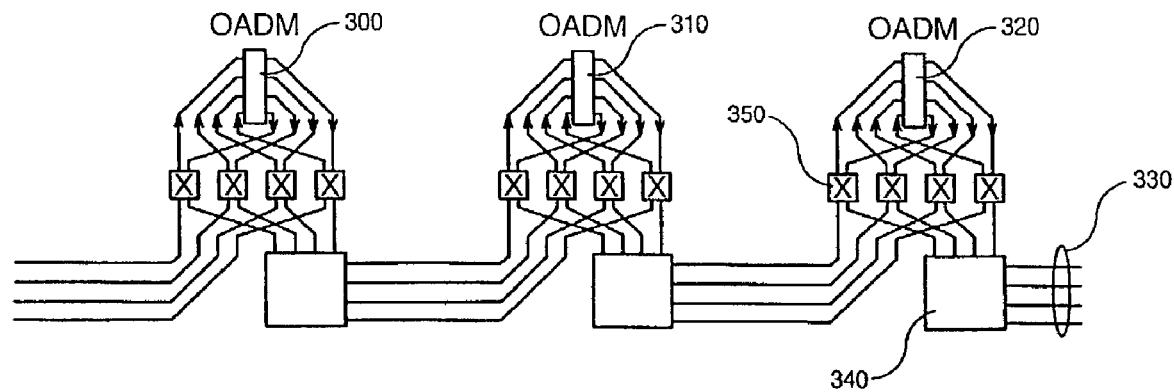
FIGS. 4A, 4B and 4C show other particular embodiments of an optical system according to the invention simplified in various ways as a function of the optical devices used.

The invention can be implemented in various ways without in any way departing from the spirit of the invention. In particular, simplifications can be made as a function of the optical devices that are accessed by the optical fibers. FIG. 4A shows a series of optical add and drop multiplexers (OADM) 300, 310 and 320 such as might be found in the successive nodes of a ring network, for example. In this case, as the loop comprises cables with four fibers 330, one 4×4 optical switch 340 is sufficient, with the four 2×2 switches 350, to rearrange the circulation direction of the fibers, whereas an 8×8 switch was necessary in the FIG. 2 general case and two 4×4 switches were necessary in FIG. 3. FIG. 4A is merely one example of the arrangements possible with this configuration, in which the optical devices are OADM or similar devices, in which example each 2×2 switch is connected on one side directly to an input and to an output of the optical devices 300, 310, 320 and on the other side to each of the two cables, directly in the case of one of them and via a 4×4 switching matrix 340 in the case of the other one.

Figure 4B:
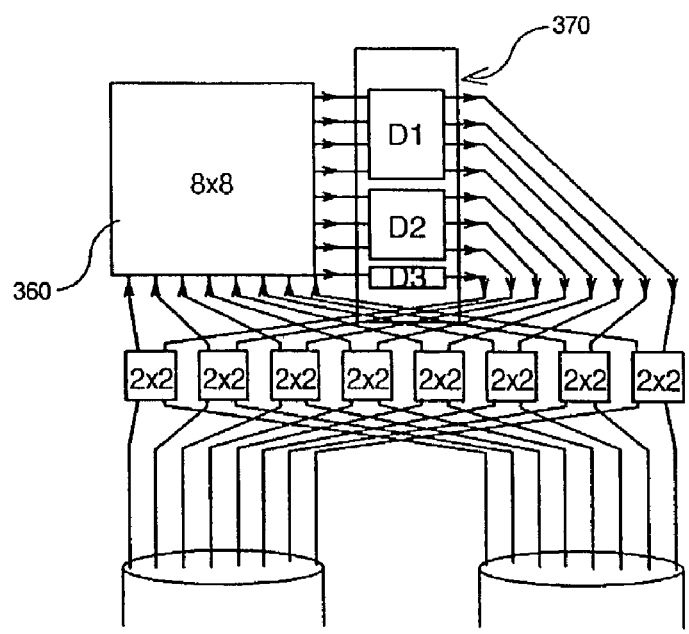
Figure 4C:
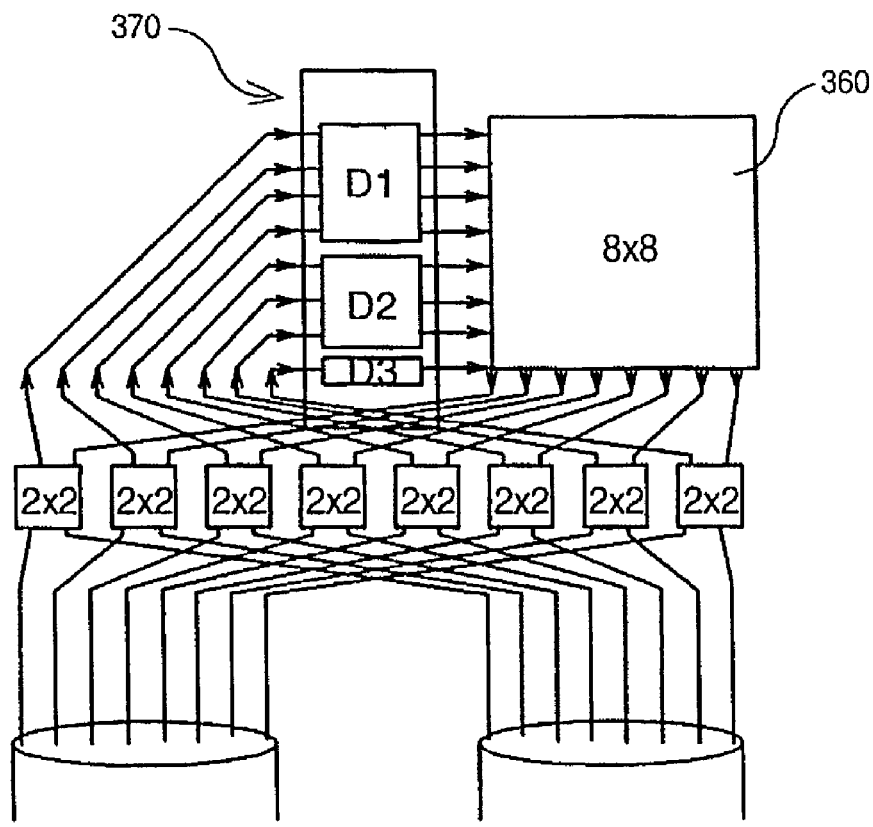

FIGS. 4B and 4C show other possible arrangements using the same result in terms of the number of elements necessary. FIG. 4B shows the example of an 8×8 switch 360 placed in front of the eight inputs of an optical device 370 of the FIG. 4A type while two cables each with eight fibers are connected to eight 2×2 optical switches similar to those of FIG. 4A. If this particular embodiment is compared to the general solution described with reference to FIG. 2, it will immediately be noted that a 16×16 switch would normally have had to be used. The embodiment shown in FIG. 4B can also be compared to that described with reference to FIG. 3 and which would have required the use of two 8×8 switches, whereas only one is necessary here. Also, it will be noted that, compared to FIG. 4A, it is merely a question of a different position of the switch 360. Whereas in FIG. 4A the switch 340 is placed in front of the 2×2 switches 350, in FIG. 4B it is placed between the 2×2 switches and the optical devices 370.

FIG. 4C shows another position for the 8×8 switch 360 from the previous figure, the switch here being placed at the output of the optical devices 370.

Figure 5:
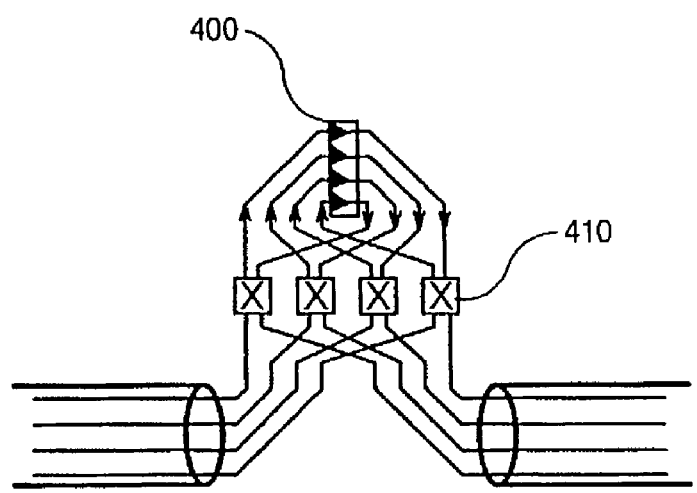
FIG. 5 shows an embodiment of an optical system according to the invention using optical amplifiers.

FIG. 5 shows another embodiment of the invention which achieves even greater simplification in the case of optical amplifier type devices 400. In this case, the ports are divided between two cables and only 2×2 optical switches 410 are necessary to be able to use the fibers and the amplifiers in either direction. Also, each of the 2×2 switches is connected directly to an input and an output of the amplifier.

FIG. 3, FIGS. 4A, 4B and 4C, and FIG. 5 are intended to show that the invention can be implemented in many forms with particular advantages as a function of the optical devices used and the optical fiber cable configurations to be interconnected. The person skilled in the art will understand the advantages of using, in a particular context, one or the other of those forms of the invention.

The invention claimed is:

1. A reconfigurable directional optical system having N ports divided between a plurality of cables, each port being individually configurable as an input or an output and said system comprising:

at least one optical device having unidirectional inputs and outputs whose total number is less than or equal to N, wherein N is an integer greater than one; and an N×N optical switch such that each of said ports can be coupled interchangeably either to one of said inputs or to one of said outputs of said optical device, said N×N optical switch comprising first and second switching layers based on smaller n×p optical switches, where n and p are integers smaller than N, wherein the number of small switches of said first switching layer is equal to the number of cables and the number of small switches of said second switching layer is equal to whichever is the greater of the number of inputs and the number of outputs of said optical device, so that an input and an output of said optical device can be connected to two separate cables from said plurality of cables.

2. The system claimed in claim 1, wherein said first switching layer includes a plurality of small switches connected directly to said ports and said second switching layer includes a plurality of small switches connected directly to the inputs and outputs of said optical device, said plurality of switching layers together implementing the overall function of said optical switch.

3. The system claimed in claim 1, wherein the inputs of said optical device are all connected to a single smaller optical switch, the inputs of said smaller optical switch and the outputs of said optical device being connected to a series of 2×2 switches so as together to implement the overall function of said optical switch.

4. The system claimed in claim 1, wherein the outputs of said optical device are all connected to a single smaller optical switch, the outputs of said smaller optical switch and the inputs of said optical device being connected to a series of 2×2 switches so as together to implement the overall function of said optical switch.

5. The system claimed in claim 3, wherein said ports are divided between two cables and each of said 2×2 switches is connected to each of said cables so that an input and an output of said optical device can be respectively connected to each of the two cables.

6. The system claimed in claim 1, wherein said ports are divided between two cables and said optical switch includes a layer of 2×2 switches, each of said 2×2 switches being connected on one side directly to an input and an output of said optical device and on the other side to each of said cables, directly in the case of one of them and via a 4×4 switching matrix in the case of the other one.

7. The system claimed in claim 1, wherein said optical device is an optical amplifier.

8. The system claimed in claim 7, wherein said ports are divided between two cables and said optical switch includes a layer of 2×2 switches, each of said 2×2 switches being connected to an input and an output of said optical amplifier.

9. The system claimed in claim 1, wherein said optical device comprises a plurality of optical subdevices.

10. An arrangement comprising a plurality of optical add and drop multiplexers in series, characterized in that each of said multiplexers is a system as claimed in claim 1.

11. The system claimed in claim 1, wherein the N×N optical switch couples at least one of said ports to one of said inputs of the optical device for a first period of time and couples the same at least one of said ports to one of said outputs of the optical device for a second period of time, wherein the first period of time and second period of time are non-overlapping, and wherein the at least one port is only coupled to one of: the inputs and the outputs of the optical device, at each point in time.

12. A reconfigurable direction optical system comprising:
 a plurality of fibers;
 at least one optical device having unidirectional inputs and outputs; and
 a switch configured to change propagation direction in at least one fiber of the plurality of fibers transmitting optical signals,
 wherein the switch comprises a first switching layer and a second switching layer and wherein a number of switches of said first switching layer is equal to a number of cables and a number of switches of the second switching layer is equal to a greater of a number of the inputs and a number of the outputs of said optical device.

* * * * *